United States Patent
Galceran Oms et al.

(10) Patent No.: US 12,269,532 B2
(45) Date of Patent: Apr. 8, 2025

(54) FORMING SHEET METAL PART FOR A VEHICLE FRAME AND CORRESPONDING PRODUCTION METHOD

(71) Applicant: Autotech Engineering, S.L., Amorebieta Etxano (ES)

(72) Inventors: Laura Galceran Oms, Barcelona (ES); David Corón Moreno, Barcelona (ES); Marti Meca Martínez, Santpedor Barcelona (ES); Sergi Marquez Duran, Rajadell Barcelona (ES)

(73) Assignee: AUTOTECH ENGINEERING, S.L., Amorebieta Etxano (ES)

( * ) Notice: Subject to any disclaimer, the term of this patent is extended or adjusted under 35 U.S.C. 154(b) by 323 days.

(21) Appl. No.: 17/774,538

(22) PCT Filed: Nov. 6, 2020

(86) PCT No.: PCT/EP2020/081322
§ 371 (c)(1),
(2) Date: May 5, 2022

(87) PCT Pub. No.: WO2021/089800
PCT Pub. Date: May 14, 2021

(65) Prior Publication Data
US 2022/0388574 A1 Dec. 8, 2022

(30) Foreign Application Priority Data

Nov. 8, 2019 (EP) ...................................... 19382980

(51) Int. Cl.
*B62D 21/15* (2006.01)
*B21D 35/00* (2006.01)
(Continued)

(52) U.S. Cl.
CPC ............ *B62D 21/15* (2013.01); *B21D 35/005* (2013.01); *B21D 47/01* (2013.01); *B21D 53/88* (2013.01);
(Continued)

(58) Field of Classification Search
CPC ...... B62D 21/15; B21D 35/005; B21D 47/01; B21D 53/88; B21D 22/022; B21D 22/208;
(Continued)

(56) References Cited

U.S. PATENT DOCUMENTS 5,235,469 A * 8/1993 Horian ..................... G02B 5/08
359/872
2011/0233946 A1 9/2011 Pellmann et al.
(Continued)

FOREIGN PATENT DOCUMENTS

DE 102018129725 A1 * 5/2020 ........... B60R 19/023
WO 2015/179747 A1 11/2015

OTHER PUBLICATIONS

International Search Report mailed on Jan. 22, 2021, in connection with corresponding International Application No. PCT/EP2020/081322; 3 pages.

*Primary Examiner* — Lee A Holly
(74) *Attorney, Agent, or Firm* — McCormick, Paulding & Huber PLLC

(57) ABSTRACT

A forming sheet metal part (1) for a vehicle frame includes: a first portion (2) being locally heat-softened after the sheet metal part (1) has been formed out. The part (1) further includes a dedicated three-dimensional distortion-absorbing area (4), defining an internal boundary (6) within which the first portion (2) is to be locally heat-softened after the sheet metal part (1) has been formed out. The distortion-absorbing area (4) is dimensioned such that once said locally heat-
(Continued)

softening step has been performed, the internal boundary (6) is adjacent to the first portion (2) and encloses the first portion (2) to absorb the dimensional distortions induced by the locally heat-softened first portion. The invention further relates to a method for producing a forming sheet metal part (1).

20 Claims, 10 Drawing Sheets

(51) Int. Cl.
  *B21D 47/01* (2006.01)
  *B21D 53/88* (2006.01)
  *C21D 7/02* (2006.01)
  *C21D 7/13* (2006.01)
  *C21D 8/02* (2006.01)

(52) U.S. Cl.
  CPC ............ *C21D 7/02* (2013.01); *C21D 7/13* (2013.01); *C21D 8/0247* (2013.01); *C21D 8/0294* (2013.01)

(58) Field of Classification Search
  CPC .......... C21D 7/02; C21D 7/13; C21D 8/0247; C21D 8/0294; C21D 1/673; C21D 1/32; C21D 1/34; C21D 8/005; C21D 2221/00; C21D 9/0068
  See application file for complete search history.

(56) References Cited

U.S. PATENT DOCUMENTS

| | | |
|---|---|---|
| 2014/0166166 A1 | 6/2014 | Zimmermann et al. |
| 2019/0054513 A1 | 2/2019 | Hielscher et al. |
| 2019/0367095 A1* | 12/2019 | Steffens ................. B62D 25/06 |
| 2020/0164818 A1* | 5/2020 | Frost ..................... B60R 19/023 |
| 2021/0262075 A1* | 8/2021 | Yasuyama ............... C22C 38/04 |

* cited by examiner

FORMING SHEET METAL PART FOR A VEHICLE FRAME AND CORRESPONDING PRODUCTION METHOD

CROSS-REFERENCE TO RELATED APPLICATION

This application is a National Stage application of International Patent Application No. PCT/EP2020/081322, filed on Nov. 6, 2020, which claims priority to European Application No. 19382980.1, filed Nov. 8, 2019, each of which is hereby incorporated by reference in its entirety.

TECHNICAL FIELD

The invention is in the field of the production of sheet metal parts for frames of vehicles in the vehicle industry, and especially for those parts related to the crash performance and passive security. Vehicle part frames refer to any kind of vehicles such as cars, trucks, trains, subways or the like.

More particularly, the invention relates to a forming sheet metal part for a vehicle frame comprising a first portion of said sheet metal part being locally heat-softened after said sheet metal part has been formed out.

The invention further relates to a method for producing a forming sheet metal part with locally heat-softened portions comprising a first forming step, for forming out said forming sheet metal part and a locally heat-softening step, after said first forming step, for locally heat-softened a first portion of said forming sheet metal part.

In the invention, the term heat-softened is to be understood as a modification in the metallographic structure of the sheet metal via heat, such as to reduce the yield stress thereof in the heat-softened portion. Due to this metallographic modification this portion of the part is provided with different mechanical properties compared to the rest of the part and particularly a higher ductility.

BACKGROUND

Modern vehicle frames are produced from sheet metal blanks by processes such as cold stamping, press hardening, roll forming or indirect press hardening. An example of this kind of vehicle parts are frame pillars, rockers, roof top parts, floor cross members, front rails or the like. These parts are preferably made from Ultra High Strength Steels (UHSS) providing a tensile strength of about 1,500 MPa. The advantage thereof is that extremely robust parts are obtained. Thanks to these parts a passenger safety cell can be created, which in case of an accident provides a survival cage for the passengers. However, in these vehicle frames, it is also required that the energy generated during the crash is absorbed by some predetermined areas thereof. This energy is absorbed by a controlled deformation of these areas. The more energy is dissipated by the deformation, the less damages are caused to the passengers.

To solve this problem and in order to have a more predictable crash behaviour, as well as to also avoid cracks during post operation processes, such as welding processes, it is known to create areas in the frame with reduced tensile strength, e.g., of about 575 to 1,300 MPa.

Several processes to create these softened areas in the frame are known, such as by selective quenching of some portions of the frame, by split furnace heating of some components of the part or by laser or induction softening of a portion of these parts.

The laser softening process is especially advisable because of its flexibility and adaptability. The method is commonly applied to Ultra High Strength Steels (UHSS) and consists of a non-isothermal rapid heating treatment of hot stamping parts, i.e., simultaneous forming and quenching in the die. This results in a tempering of the martensite contained in the material and thus a reduction of the tensile strength of the portion of the on which the process has been carried out.

The aim of the laser-softening process is to reach a temperature between 400° C. and 900° C. and preferably from 500° C. to 750° C. to obtain tensile strength values within a range from 500 MPa to 1,400 MPa and preferably from 600 MPa to 1200 MPa. The softening treatment is locally applied, without altering the properties of the rest of the part. The areas where the tempering occurs are called soft zones.

The problem associated to the laser-softening process is that since it is a local heat treatment, it induces geometrical distortions in the parts. This may cause the parts to go out of tolerances in the heated area. This effect causes problems in order to validate the technology, because the vehicle manufacturers may be reluctant to use the technology if the geometrical specifications are not achieved after the local softening process.

A possible solution to this problem consists in introducing a post-processing step in order to bring the part again in the target tolerances. However, this additional step is less desired because its additional costs and logistic complication.

US20190054513A1 discloses a method for producing a motor vehicle component with at least two regions of different strengths and a protective layer, consisting of the following process steps: [a] providing precoated blanks made of a steel alloy, which can be hardened, [b] homogeneously heating to a heating temperature, which is at least greater than or equal to the AC1 temperature, preferably greater than or equal to the AC3 temperature, [c] holding the heating temperature, so that the precoating alloys with the blank, [d] homogeneously intercooling the alloyed blank to an intercooling temperature between 450° C. and 700° C., [e] partially heating the blank from the intercooling temperature to at least the AC3 temperature in regions of the first type and holding regions of the second type at substantially intercooling temperature, [f] hot forming and press hardening the partially tempered blank so as to form the motor vehicle component. A tensile strength of greater than 1400 MPa is produced in regions of the first type, a tensile strength of less than 1050 MPa is produced in regions of the second type, and a transition region is produced between said regions.

US20140166166A1 discloses a method for producing an automobile column. The automobile column has a region of a first type and a region of a second type which have mutually different strengths. A transition region having a width of less than 50 mm is formed between the two regions. The automobile column has in the region of the first type a bainitic structure and in the region of the second type a martensitic structure.

SUMMARY

It is an object of the invention to propose a forming sheet metal part for a vehicle frame with an enhanced crash behaviour which is easy to produce but that maintains the required production quality. This purpose is achieved by a forming sheet metal part of the type indicated at the beginning, characterized in that it further comprises a three-dimensional distortion-absorbing area, defining an internal boundary within which said first portion is to be locally heat-softened after said sheet metal part has been formed out, and said distortion-absorbing area being dimensioned such that once said locally heat-softening step has been performed, said internal boundary is adjacent to said first portion and encloses said first portion to absorb the dimensional distortions induced by said locally heat-softened first portion.

A three-dimensional distortion-absorbing area or geometrical distortion absorber can be obtained by creating any kind of dedicated recess or projection in the part protruding or penetrating in the part and having a height differentiated from rest of the part surrounding this distortion-absorbing area.

The distortion-absorbing area provides for a higher stiffness of the surroundings of the portion which must be later heat-softened. Then, when the heat-softening step is performed, the tensions induced by the heat in the first portion of the part, are counteracted by this higher stiffness area around. Therefore, the eventual deformations of the first portion are reduced or compensated, and the first portion maintains its dimensional stability or at least the deformations are reduced such as to maintain the part within the predetermined tolerances.

The invention further includes a number of preferred features that are object of the dependent claims and the utility of which will be highlighted hereinafter in the detailed description of an embodiment of the invention.

Preferably, the sheet metal part is formed by one or more processes of the group consisting of cold stamping, press hardening, roll forming or indirect press hardening.

Especially preferably said locally heat-softening step is carried out by induction, by laser beam irradiation, resistive heating or the like. However, in order to have a local heating process as flexible as possible, said laser beam irradiation is especially preferred.

As previously explained, in the most preferred application of the invention, the parts are vehicle frame parts. Therefore, in order to have a good processability of the parts by way of forming, the sheet metal part has a thickness between 0.5 and 8 mm, preferably between 0.5 and 6 mm, more preferably between 0.5 and 3 mm and especially preferably between 0.8 a 2.5 mm.

Also, for sake of a good compromise between the technical effect of compensating the deformations of the locally heat-softened first portion and avoiding the introduction of undesired tensional states in the part, in another embodiment said distortion-absorbing area has a height between 2 and 20 mm. This range avoid the creation of areas in the part that could lead to undesired fatigue failures thereof.

In order to guarantee an optimum deformation absorption of the dimensional distortions induced by the heat, in a preferred embodiment said locally heat-softened first portion is distanced between 0 and 50 mm, and preferably between 0 and 10 mm to said internal boundary.

Preferably, in order to avoid the creation of a notch effect in the distortion-absorbing area, said distortion-absorbing area comprises rounded edges and said internal boundary is defined by the inner tangency line of said rounded edges.

Preferably when said rounded edges have a radius between 2 and 20 mm, and preferably between 2 and 10 mm, fatigue cracks caused either through the creation of the distortion-absorbing area or the subsequent local heating can be eliminated.

In order to obtain an optimum control of the deformation of the sheet metal part in crash situations, said first portion has an area between 100 mm$^2$ and 50,000 mm$^2$ and preferably, 100 mm$^2$ and 15,000 mm$^2$. In order to simplify the creation of the heat-softened portions, it is also especially preferred that the first portion is a square or a rectangle.

In another embodiment, said distortion-absorbing area is one of the group formed by a projection, a recess or a surrounding bump and in that said distortion-absorbing area encloses a flat portion for performing said locally heat-softened first portion. Especially preferably, the cross section of distortion-absorbing area is a semicircle, a triangle, an isosceles trapezoid cross section with rounded edges.

Within the different shapes of distortion absorbing area a surrounding bump is especially preferable in order to obtain the best distortion reduction.

Also, when said distortion-absorbing area is a surrounding bump, it further comprises a plateau of greater than 0 to 20 mm wide. The plateau provides for a better conformability and further creates an area on which other parts can be welded to.

In a further embodiment, in order to minimize the deformation of the part after the heat-softening step, said internal boundary is a closed boundary such as to completely enclose said locally heat-softened first portion.

It is another object of the invention to propose a method for producing a forming sheet metal part with locally heat-softened portions of the type described above, characterized in that it further comprises a second forming step, prior to said heat-softening step, for forming a dedicated three-dimensional distortion-absorbing area, said three-dimensional distortion absorbing area defining an internal boundary within which said first portion is to be locally heat-softened, said distortion-absorbing area being dimensioned such that once said locally heat-softening step has been performed, said internal boundary is adjacent to said first portion and encloses said first portion to absorb the dimensional distortions induced by said heat-softening step.

It is especially preferable that said forming step is carried out by hot stamping. Hot stamping allows producing stamping parts of ultra-high strength steels, such as e.g. 22MnB5 boron steel. This notably improves the passive security of the vehicle with a reduced weight of the frame. Alternatively, the part can be produced by cold stamping using conventional automotive steel either coated or uncoated.

Also, in order to reach a highly efficient production process, said first forming step is a stamping step and said first and second forming steps are performed simultaneously. By including the second forming step in the stamping die, no remarkable additional costs are introduced in the part production process, because no additional stamping step is required. However, the advantages reached by the invention are still obtained.

In another embodiment, during said locally heat-softening step said first portion of said stamping part is heated between 300° C. and 1200° C. and preferably from 500° C. to 800° C.

Finally, it is preferable that said locally heat-softening step is carried out by irradiating said first portion with a laser beam having a power comprised between 500 W and 100 kW, preferably between 1 kW and 10 kW.

Likewise, the invention also includes other features of detail illustrated in the detailed description of an embodiment of the invention and in the accompanying figures.

BRIEF DESCRIPTION OF THE DRAWINGS

Further advantages and features of the invention will become apparent from the following description, in which, without any limiting character, preferred embodiments of the invention are disclosed, with reference to the accompanying drawings in which.

DETAILED DESCRIPTION

Figure 1:
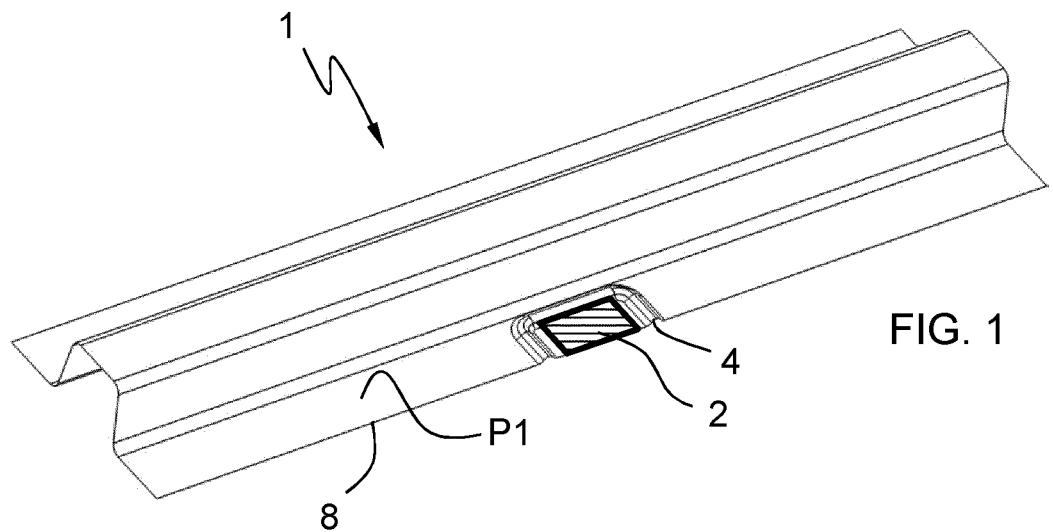
FIG. 1 shows a perspective view of a first embodiment of a forming sheet metal part according to the invention, in the shape of a longitudinal beam, the part having a distortion-absorbing area arranged on an edge of the sheet metal part and enclosing a locally heat-softened first portion.
Figure 2:
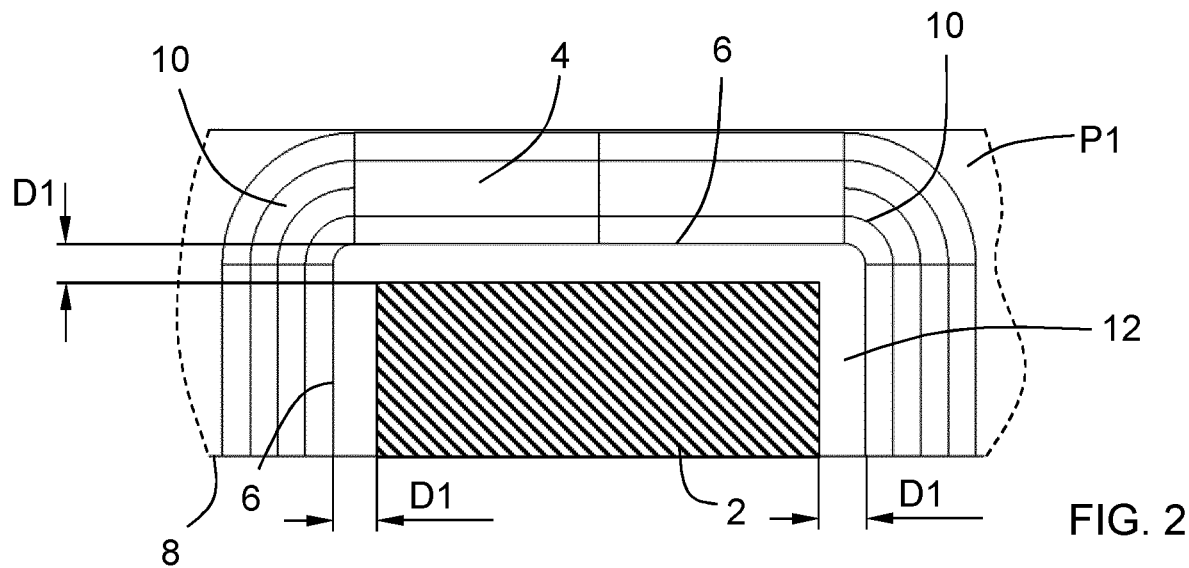
FIG. 2 shows a top view of the distortion-absorbing area of the sheet metal part of FIG. 1.
Figure 3:
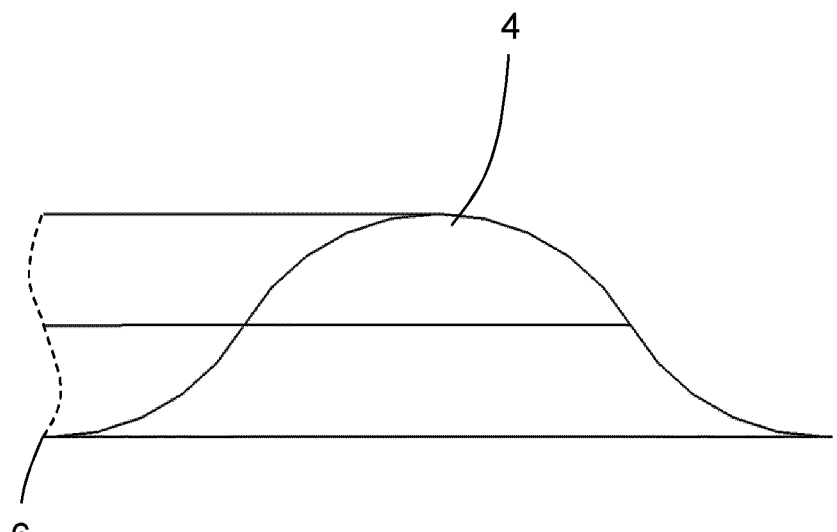
FIG. 3 shows a detailed view of the cross-section of the distortion-absorbing area of the sheet metal part of FIG. 1.

FIGS. 1 to 3 show a first embodiment of a forming sheet metal part 1 for a vehicle frame according to the invention, such as e.g., a front rail for a car or any other type of vehicle comprising a metallic frame.

Even though the part 1 has been represented in the Figures without thickness for sake of simplicity, it preferably has a thickness between 0.5 and 8 mm; preferably between 0.5 and 6 mm, e.g., in cases where the part has an overlap of sheet metal parts. In other cases, the part 1 can have a thickness between 0.5 and 3 mm and especially preferably between 0.8 a 2.5 mm.

Also, the part 1 is depicted as a longitudinal straight beam. However, the part can have any desired configuration such as e.g., an A, B or C pillar, a hinge pillar, a rocker, a front or a rear rail, a body floor or any other vehicle frame part.

The sheet metal part 1 comprises a first portion 2 being locally heat-softened after said sheet metal part 1 has been stamped out. Preferably, the sheet metal part 1 is laser-softened. However, other locally heat-softening methods can be used, such as induction, resistive heating or the like.

In order to solve the problem of providing a forming sheet metal part 1 with an enhanced crash behaviour, but which simultaneously is easy to produce and maintains the required production quality without the part being out of tolerances after the heat treatment, the sheet metal part 1 comprises a dedicated three-dimensional distortion-absorbing area 4, defining an internal boundary 6 within which said first portion 2 is to be locally heat-softened, after the sheet metal part 1 has been formed out. This can be especially observed in FIGS. 2 and 3, in which the distortion-absorbing area 4 is formed by a semi-circular bump with rounded edges. As it is apparent from FIG. 2, the internal boundary 6 is defined in this case by the inner tangency line of the rounded edges. Also, in this case, the distortion-absorbing area 4 has a height of 10 mm with rounded edges having a radius of 5 mm. Therefore, taking the overall plane P1 of the part in the area where the heat-softening is to be carried out, the distortion-absorbing area 4 is in this case, a surrounding bump. The distortion-absorbing area 4 encloses then the flat portion 12 in which the first portion 2 is to be heat softened.

Therefore, the distortion-absorbing area 4 is dimensioned such that once the locally heat-softening step has been performed, the internal boundary 6 is adjacent to the first portion 2 and encloses said first portion 2 to absorb the dimensional distortions induced by said locally heat-softened first portion 2.

In the invention, the expression enclosing the first portion also includes the case in which the first portion lies on an edge of the part. As it is apparent from the FIG. 2, the free edge 8 is free from the bump. However, this does not lead the part 1 to go out of the tolerances, because the rest of the distortion-absorbing area 4, compensates the deformations induced by the heat and avoids the uncontrolled deformation of the sheet metal part occurring when no distortion-absorbing area 4 is available.

The expression enclosing the first portion neither excludes that the distortion-absorbing area 4 has small interruptions in its extension. For example, in the case of FIGS. 1 to 3, it is possible that the distortion absorbing area 4 is interrupted at the corners 10. However, this does not cause that the distortion-absorbing area 4 loses the distortion-absorption effect. Indeed, the effect in this case is somehow similar as when the heat-softened first portion 2 lies on a part edge.

Also, in order to guarantee an effective function of the distortion-absorbing area 4, the locally heat-softened first portion 2 is distanced a distance D1 comprised between 0 and 50 mm and preferably between 0 and 10 mm to the internal boundary 6. In this case, it must be pointed out that the distance D1 must not be constant in all cases to have an effective distortion-absorbing effect, as it is apparent from FIG. 18.

Preferably the first portion 2 has an area between 100 mm$^2$ and 50,000 mm$^2$ and preferably between 100 mm$^2$ and 15,000 mm$^2$ and is square or rectangular shaped.

The method for producing the forming sheet metal part 1 with locally heat-softened portions is as follows.

First starting from a sheet metal blank, a first forming step takes place in a forming die or a rolling device, for forming out the sheet metal part 1. The sheet metal part can be produced by methods such as cold stamping, press hardening, roll forming or indirect press hardening. Even though the part can be stamped both in cold or in hot conditions or by rolling, preferably the forming step is carried out by press hardening, also known as hot stamping.

Then a second forming step, for forming the three-dimensional distortion-absorbing area 4, takes place. Preferably this second forming step is carried out simultaneously with the first forming step, when the method used is either by cold stamping or press hardening. The second forming step defines an internal boundary 6 within which the first portion 2 is to be locally heat-softened.

Finally, the locally heat-softening step takes place, after the stamping step, for locally heat-softening a first portion 2 of said stamping part. Especially preferably the heat-softening step is carried out by irradiating the first portion 2 with a laser beam having a power comprised between 500 W and 100 kW and especially preferably between 1 kW and 10 kW. Then the first portion 2 is heated between 400° C. and 1,200° C. and preferably from 500° C. to 800° C. The distortion-absorbing area 4 is dimensioned such that once the locally heat-softening step has been performed, the internal boundary 6 is adjacent to the first portion 2 and encloses the first portion 2 to absorb the dimensional distortions induced by the heat-softening step.

Figure 4A:
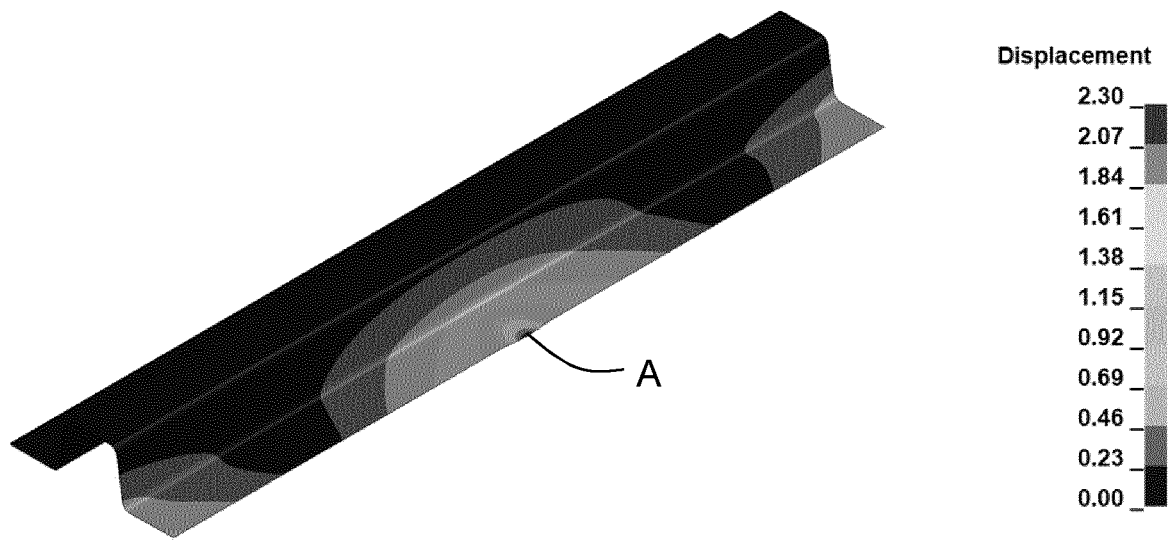
FIG. 4A shows a numerical simulation of the deformation of the sheet metal part of FIG. 1, after the creation of the locally heat-softened first portion, when the part does not have a distortion absorbing area.
Figure 4B:
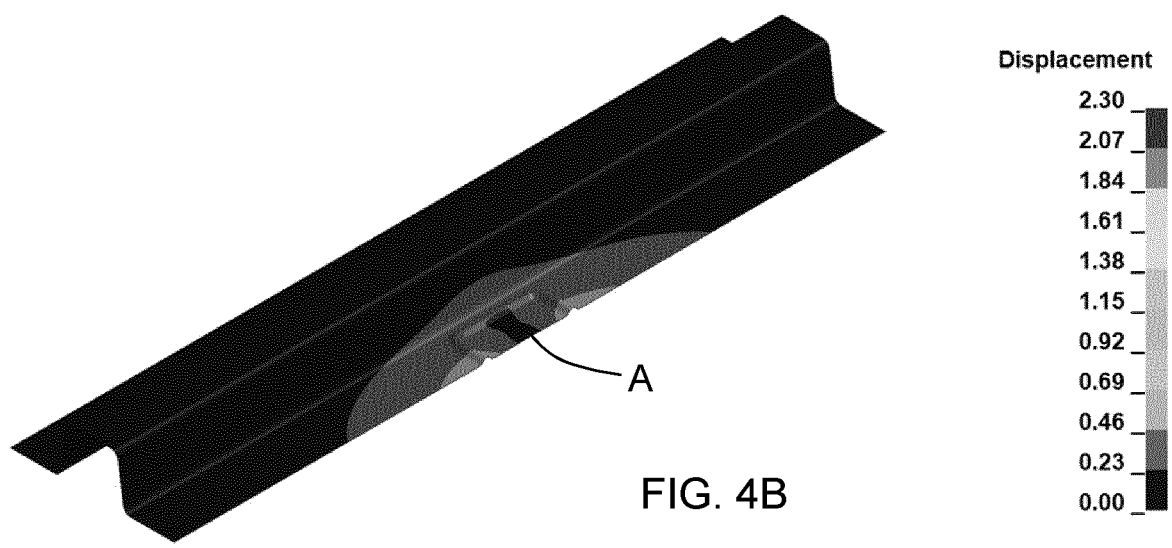
FIG. 4B shows a numerical simulation of the deformation of the sheet metal part of FIG. 1, after the creation of the locally heat-softened first portion, when the part has a dedicated distortion absorbing area according to the invention enclosing the first portion.

FIGS. 4A and 4B show the effect of the creation of a distortion-absorbing area 4.

FIG. 4A shows the deformation of the sheet metal part 1, after the creation of the heat-softened first portion 4, in the case that no distortion absorbing area 4 is available. In this case, following distortion values are achieved.

TABLE 1

| Sheet metal part with no distortion-absorbing area 4 | Figure 4A |
|---|---|
| Maximum distortion | 2.280 mm |
| Distortion in the center area A | 2.280 mm |

Instead, FIG. 4B shows the deformation of the sheet metal part 1, after the creation of the heat-softened first portion 4, when the part has a distortion absorbing area 4, thus reaching followings deformation values, as well as the following % deformation reduction.

TABLE 2

| Sheet metal part with distortion-absorbing area 4 | Figure 4B |
|---|---|
| Maximum distortion | 0.555 mm |
| Distortion in the center area A | 0.139 mm |
| % Reduced Maximum Distortion | 75.7% |
| % Reduced Distortion in center area | 93.9% |

Therefore, from the previous table it is clearly derivable that the distortion-absorbing area 4 leads to a clear deformation reduction of the sheet metal part 1 after the locally heat-softening process has taken place. In particular, with the distortion-absorbing area 4, a 75.7% deformation reduction is achieved, relative to the maximum distortion over the sheet metal part. Additionally, in the center area of the heat softened part, even better results are achieved thanks to the surrounding bump, since a 93.3% deformation reduction can be obtained.

Below, further embodiments are described, having a plurality of features in common with the previous first embodiment. Therefore, from now on, only the distinguishing features are described, while for the common features, reference is made to the description above.

Figure 5:
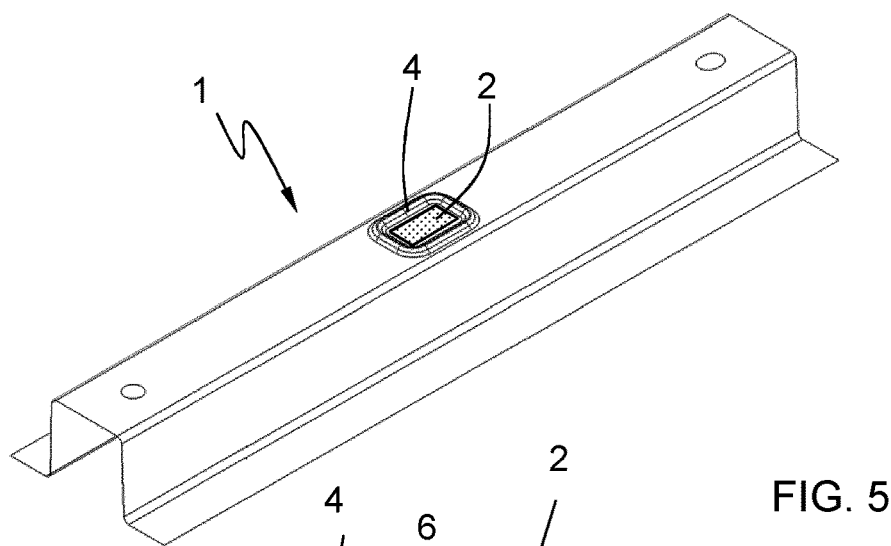
FIG. 5 shows a perspective view of a second embodiment of a forming sheet metal part according to the invention, in the shape of a longitudinal beam, the part having a distortion-absorbing area arranged in the center of the sheet metal part and enclosing a locally heat-softened first portion.
Figure 6:
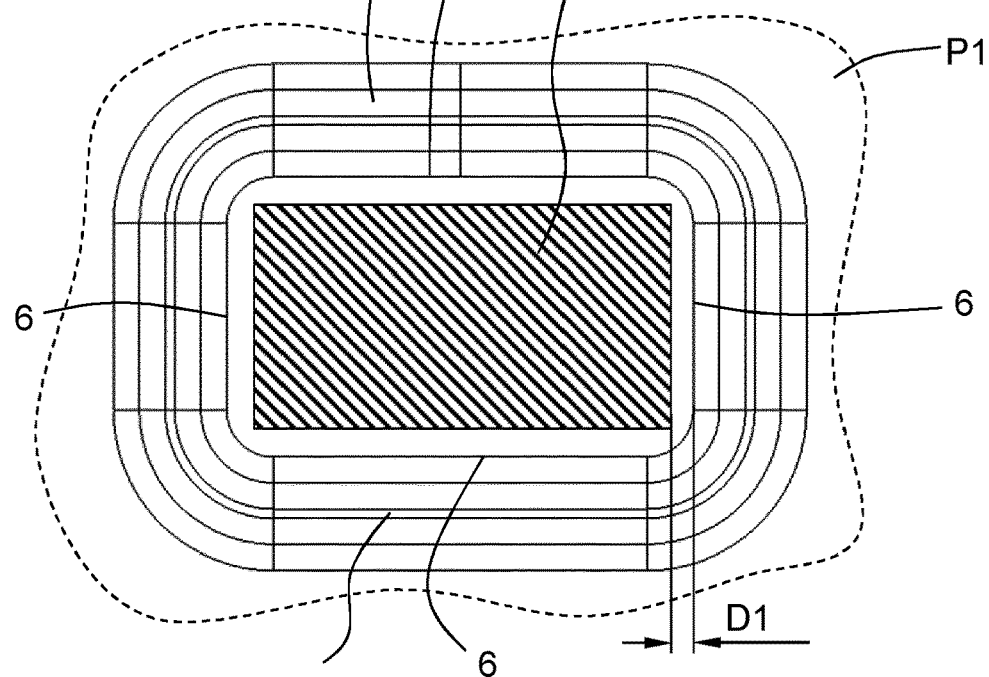
FIG. 6 shows a top view of the distortion-absorbing area of the sheet metal part of FIG. 5.
Figure 7:
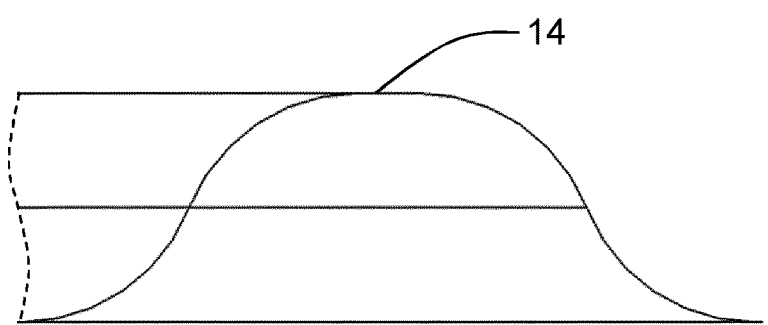
FIG. 7 shows a detailed view of the cross-section of the distortion-absorbing area of the sheet metal part of FIG. 5.

FIGS. 5 to 7 show a second embodiment of the sheet metal part according to the invention. As it is apparent, in this case, the distortion-absorbing area 4 is in the central area of the part. Again, for sake of simplicity a longitudinal U-shaped beam is shown, such as a car front rail. However, again the invention is applicable to any sheet metal part of a vehicle frame.

The distortion-absorbing area 4 is now a closed surrounding bump with rounded corners 10. More particularly, in this case the internal boundary 6 is a closed boundary such as to completely enclose the locally heat-softened first portion 2. In this case then the distortion absorbing area 4 provides for a more homogeneous and performing distortion absorbing effect as shown below in the comparative tables 3 and 4. Additionally, and differently to the embodiment before, the distortion-absorbing area 4 has further a plateau 14 between 0.1 and 20 mm wide.

Figure 8A:
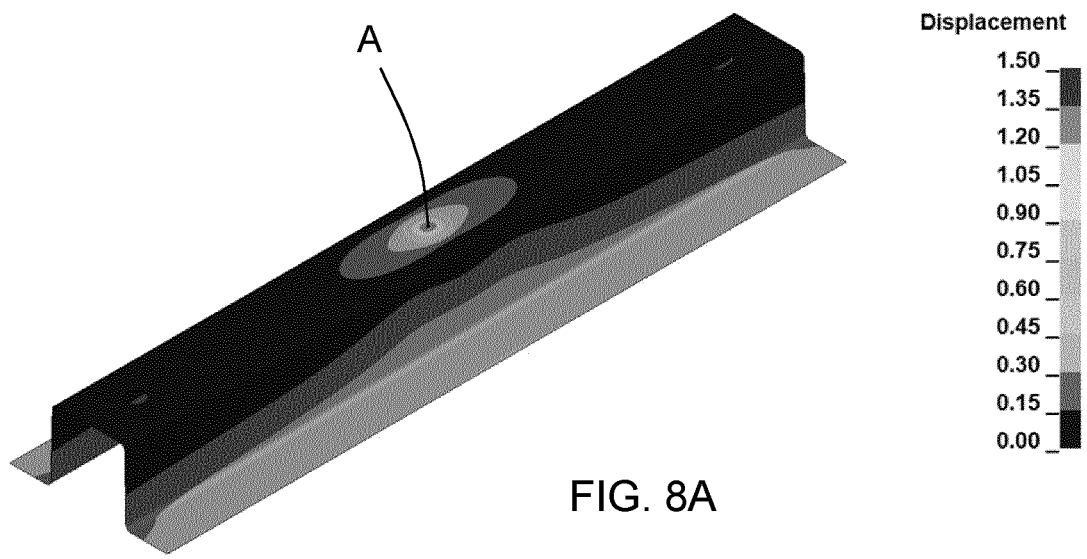
FIG. 8A shows a numerical simulation of the deformation of the sheet metal part of FIG. 5, after the creation of the locally heat-softened first portion, when the part does not have a distortion absorbing area.

Following deformation values were obtained in a sheet metal part without geometrical distortion absorber, corresponding to FIG. 8A.

TABLE 3

| Sheet metal part with no distortion-absorbing area 4 | Figure 8A |
|---|---|
| Maximum distortion | 1.369 mm |
| Distortion in the center area A | 1.369 mm |

Instead, by providing a geometrical distortion absorber in the shape of a surrounding bump with an internal boundary 6 which is a closed boundary such as to completely enclose said locally heat-softened first portion 2, especially performing results were obtained as it is apparent from Table 4.

TABLE 4

Figure 8B:
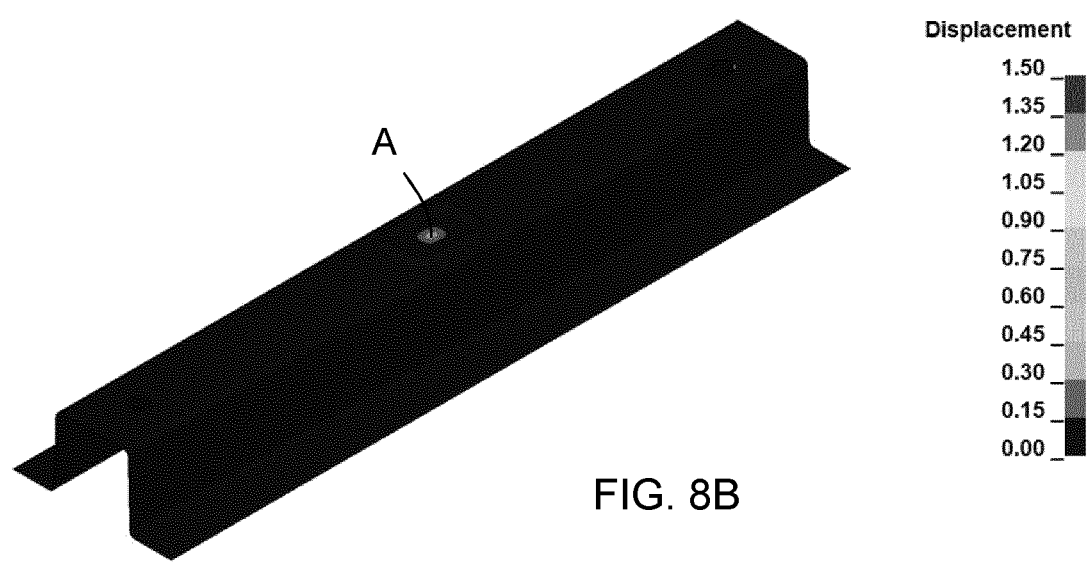
FIG. 8B shows a numerical simulation of the deformation of the sheet metal part of FIG. 5, after the creation of the locally heat-softened first portion, when the part has a dedicated distortion absorbing area according to the invention enclosing the first portion.

| Sheet metal part with distortion-absorbing area 4 | Figure 8B |
|---|---|
| Maximum distortion | 0.350 mm |
| Distortion in the center area A | 0.350 mm |
| % Reduced Maximum Distortion | 74.4% |
| % Reduced Distortion in center area | 74.4% |

Figure 9:
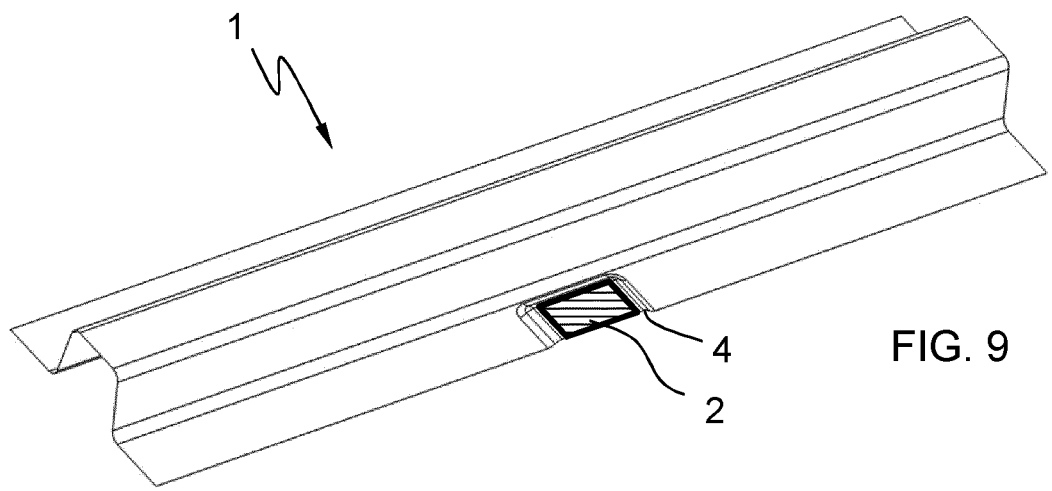
FIGS. 9 to 11 show a perspective view of a third embodiment of a forming sheet metal part according to the invention, in the shape of a longitudinal beam, the part having a distortion-absorbing area arranged on an edge of the sheet metal part and enclosing a locally heat-softened first portion.
Figure 10:
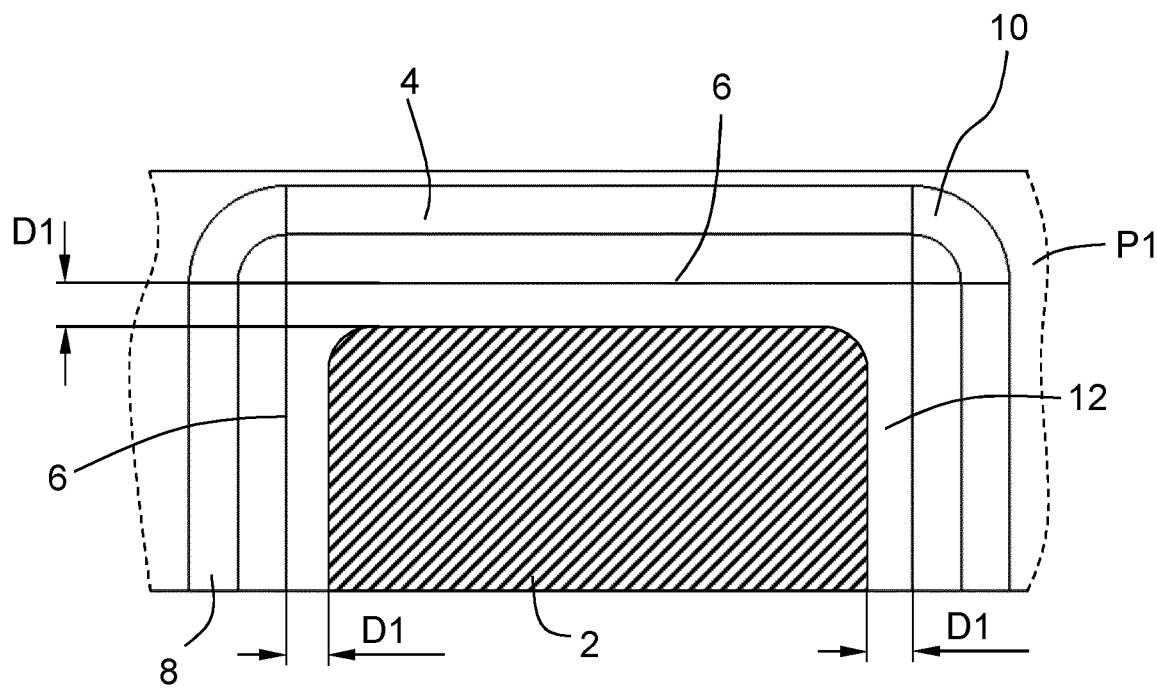
Figure 11:
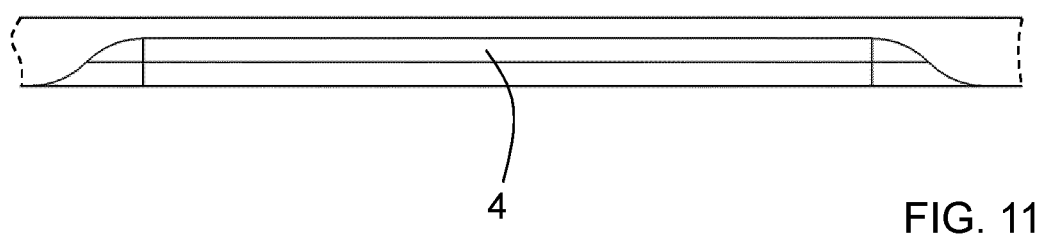

FIGS. 9 to 11 show an embodiment, in which the distortion-absorbing area 4 is a projection having a cross-section of an isosceles trapezoid with rounded corners.

Figure 12A:
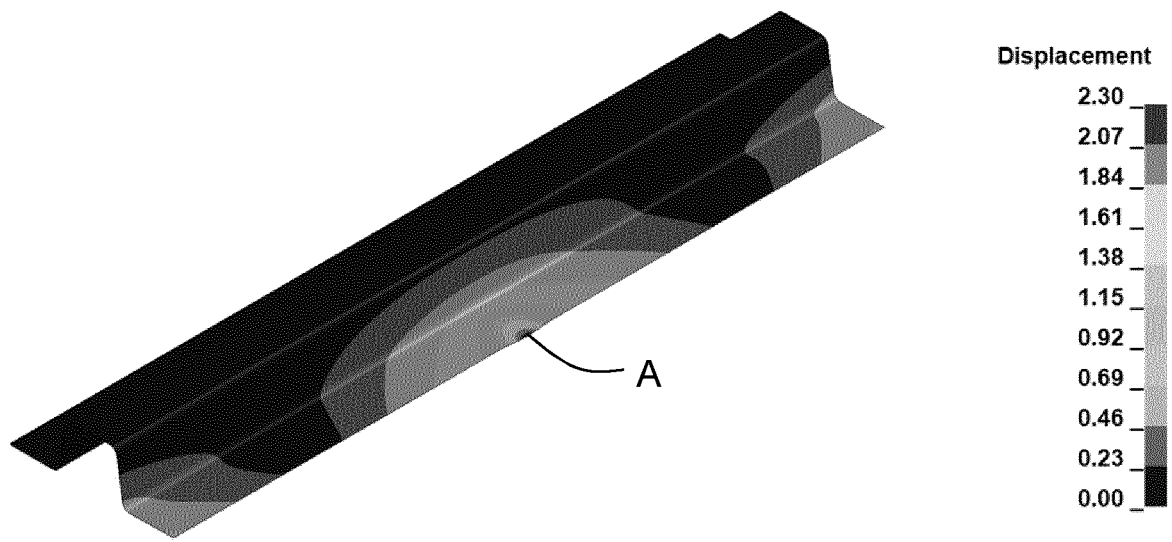
FIGS. 12A and 12B show a numerical simulation of the deformation of the sheet metal part of FIG. 9, after the creation of the locally heat-softened first portion, respectively without and with a distortion absorbing area.

Table 5 shows the deformation results of a forming sheet metal part according to FIG. 12A, without a distortion-absorbing area 4.

TABLE 5

| Sheet metal part with no distortion-absorbing area 4 | Figure 12A |
|---|---|
| Maximum distortion | 2.280 mm |
| Distortion in the center area A | 2.280 mm |

Figure 12B:
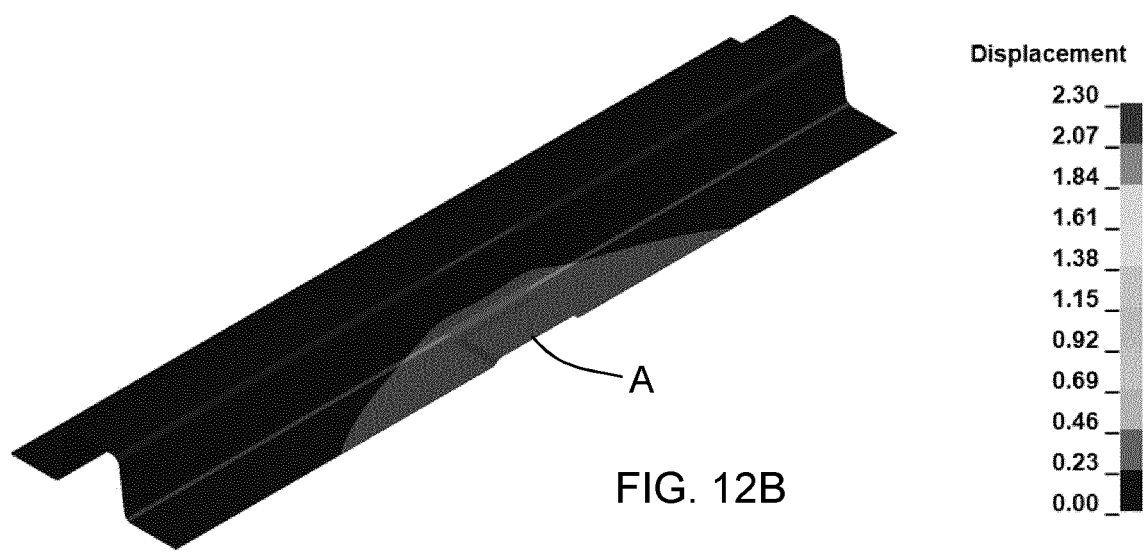

Again, as it is apparent from Table 6, thanks to the truncated pyramid like distortion-absorbing area 4 as the one in FIG. 12B, a maximum distortion reduction of 83% is achieved.

TABLE 6

| Sheet metal part with distortion-absorbing area 4 | Figure 12B |
|---|---|
| Maximum distortion | 0.388 mm |
| Distortion in the center area A | 0.388 mm |
| % Reduced Maximum Distortion | 83% |
| % Reduced Distortion in center area | 83% |

Figure 13:
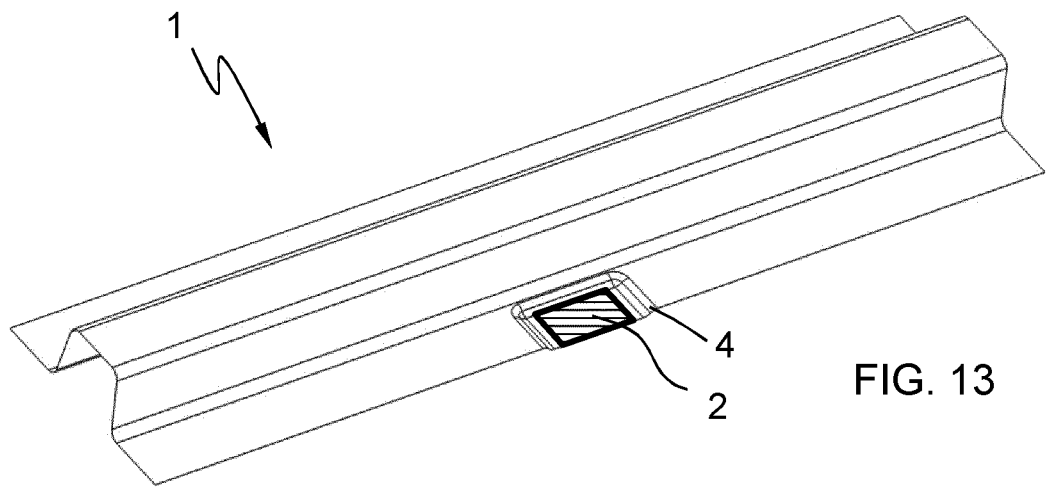
FIGS. 13 to 15 show a perspective view of a fourth embodiment of a forming sheet metal part according to the invention, in the shape of a longitudinal beam, the part having a distortion-absorbing area arranged on an edge of the sheet metal part and enclosing a locally heat-softened first portion.
Figure 14:
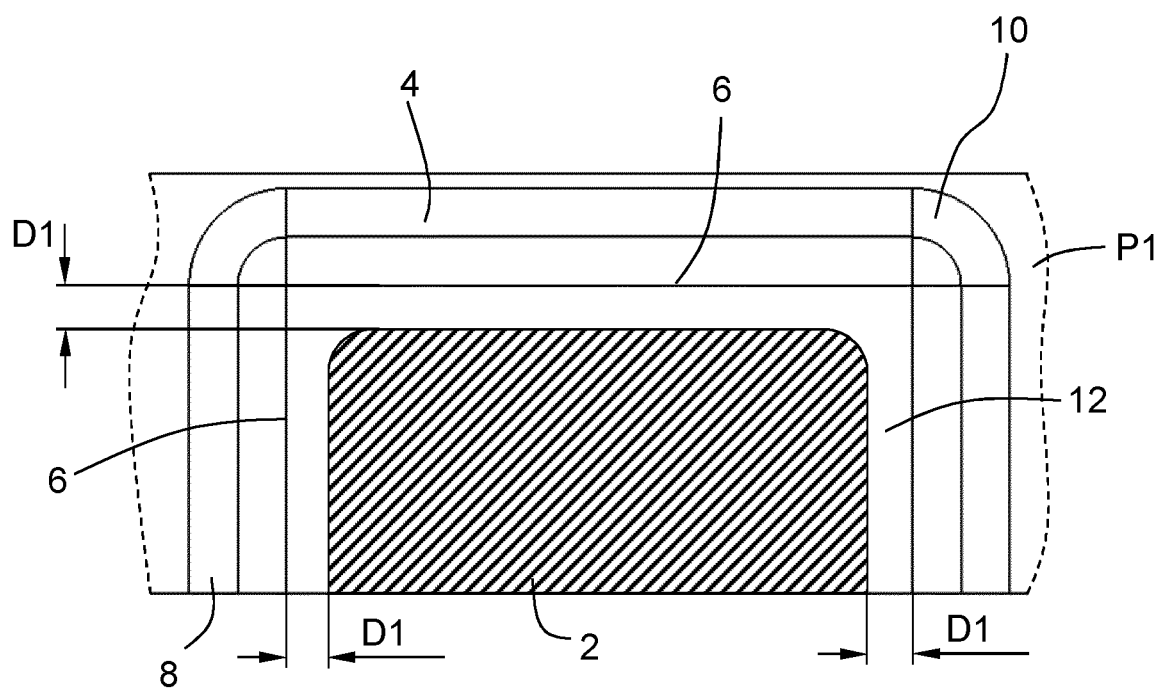
Figure 15:
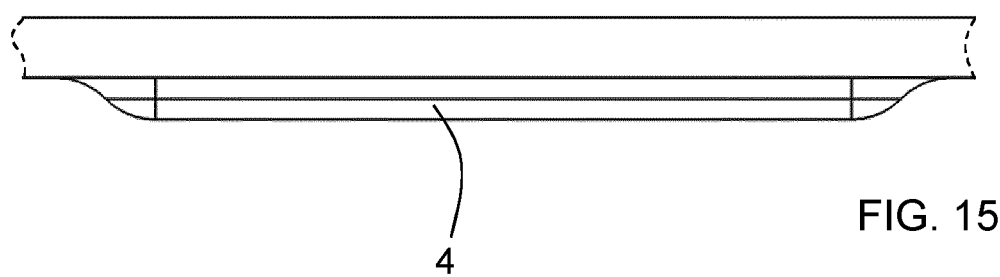

The embodiment of FIGS. 13 to 15 is similar to the one of FIGS. 9 to 11, but in this case, the distortion absorbing-area 4 is a recess, having a cross-section of an inverted isosceles trapezoid with rounded corners.

Figure 16A:
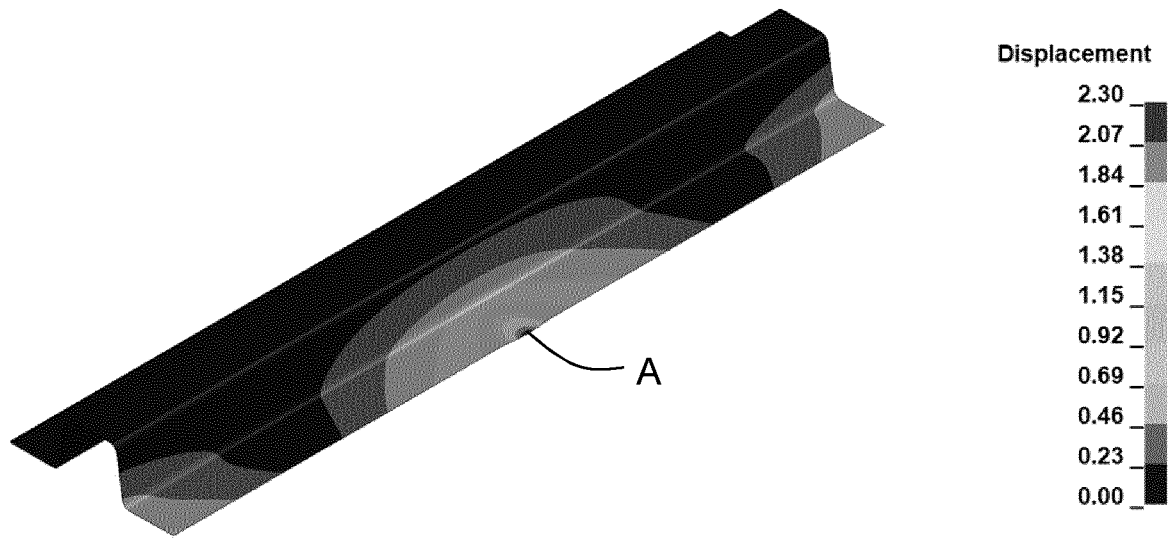
FIGS. 16A and 16B show a numerical simulation of the deformation of the sheet metal part of FIG. 13, after the creation of the locally heat-softened first portion, respectively without and with a distortion absorbing area.

Table 7 shows the deformation results of a forming sheet metal part according to FIG. 16A, without a distortion-absorbing area 4.

TABLE 7

| Sheet metal part with no distortion-absorbing area 4 | Figure 12A |
|---|---|
| Maximum distortion | 2.280 mm |
| Distortion in the center area A | 2.280 mm |

Figure 16B:
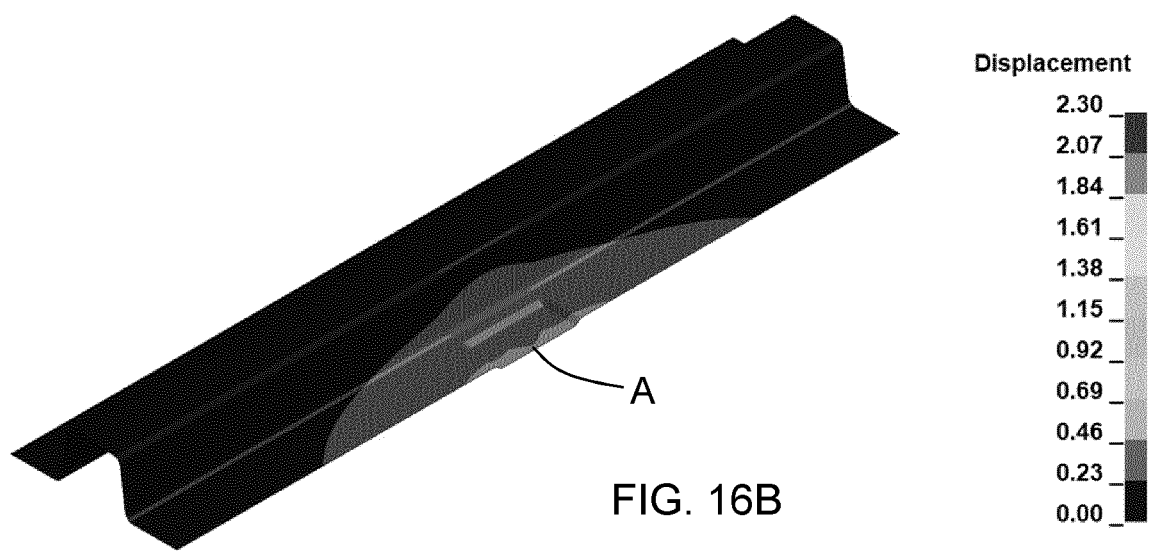

Again, as it is apparent from Table 8, thanks to the inverted truncated pyramid like distortion-absorbing area 4 as the one in FIG. 16B, a maximum distortion reduction of 83% is achieved.

TABLE 8

| Sheet metal part with distortion-absorbing area 4 | Figure 16B |
|---|---|
| Maximum distortion | 0.540 mm |
| Distortion in the center area A | 0.488 mm |
| % Reduced Maximum Distortion | 76.3% |
| % Reduced Distortion in center area | 78.6% |

Figure 17:
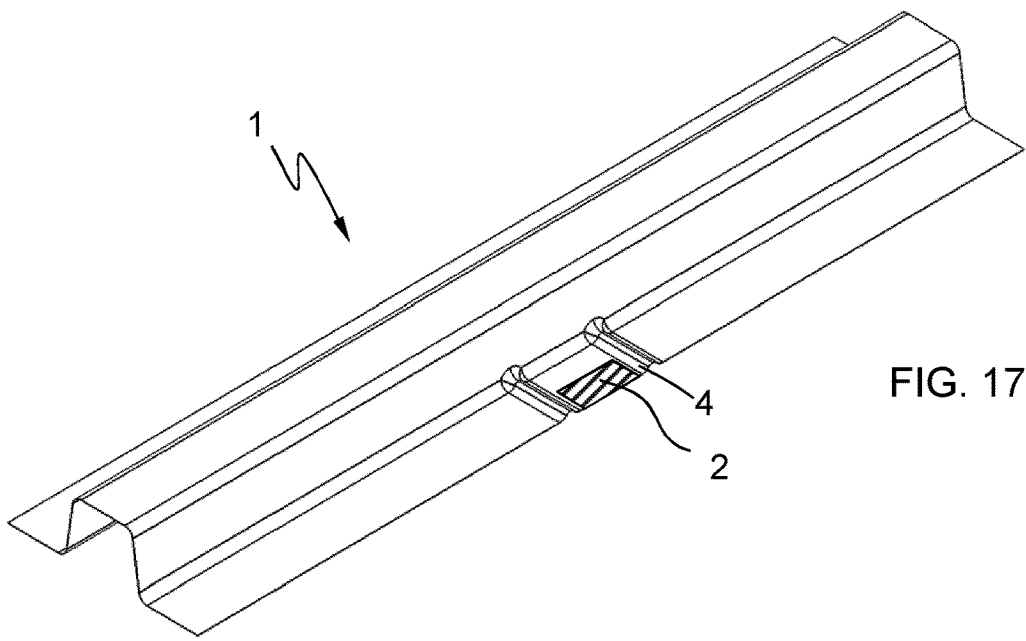
FIGS. 17 to 19 show a perspective view of a fifth embodiment of a forming sheet metal part according to the invention, in the shape of a longitudinal beam, the part having a distortion-absorbing area arranged on an edge of the sheet metal part and enclosing a locally heat-softened first portion.
Figure 18:
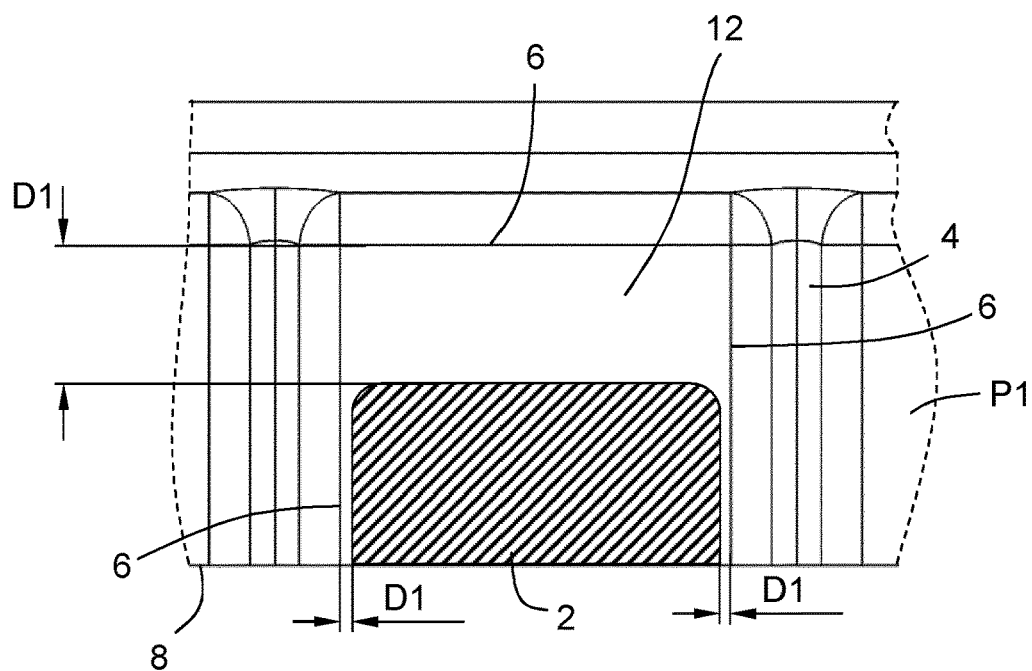
Figure 19:
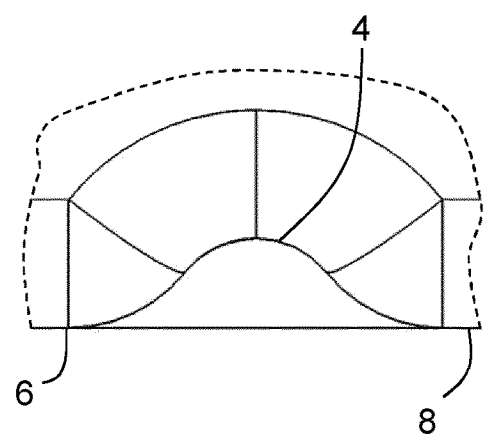

Finally, in the embodiment of FIGS. 17 to 19, the height of the distortion-absorbing area 4 is variable. In this case, the U-shaped cross-section of the beam has been used to configure a section of the distortion-absorbing area 4, such that, only two lateral bumps are required.

Figure 20A:
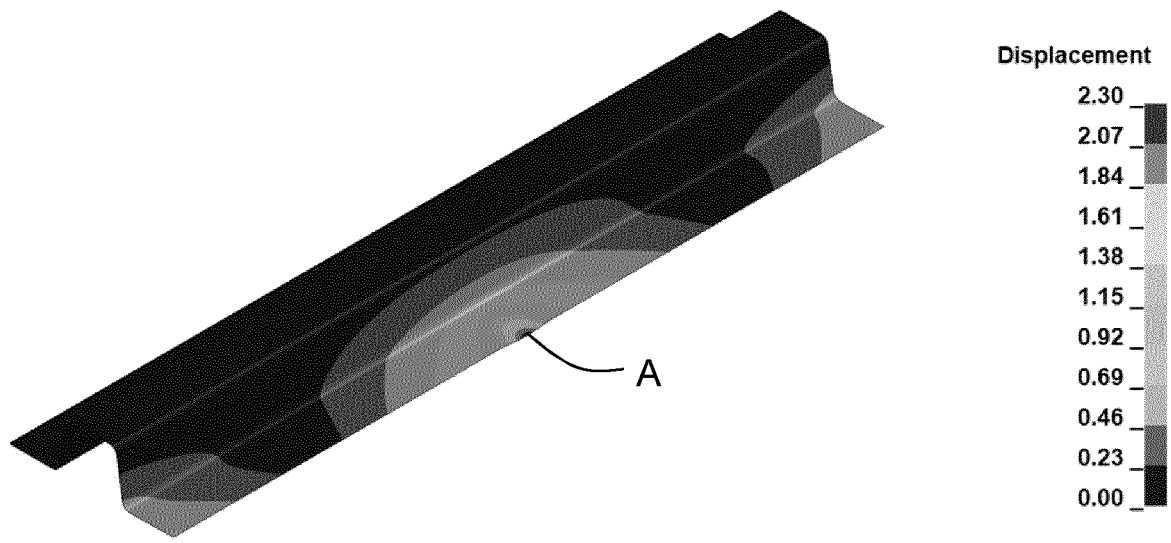
FIGS. 20A and 20B show a numerical simulation of the deformation of the sheet metal part of FIG. 17, after the creation of the locally heat-softened first portion, respectively without and with a distortion absorbing area.

Table 9 shows the deformation results of a forming sheet metal part according to FIG. 20A, without a distortion-absorbing area 4.

TABLE 9

| Sheet metal part with no distortion-absorbing area 4 | Figure 20A |
|---|---|
| Maximum distortion | 2.280 mm |
| Distortion in the center area A | 2.280 mm |

Again, as it is apparent from Table 10, in this case the deformation reduction achieved is only of 44.6%. However, the technical effect of the distortion-absorbing area 4 is still apparent.

TABLE 10

Figure 20B:
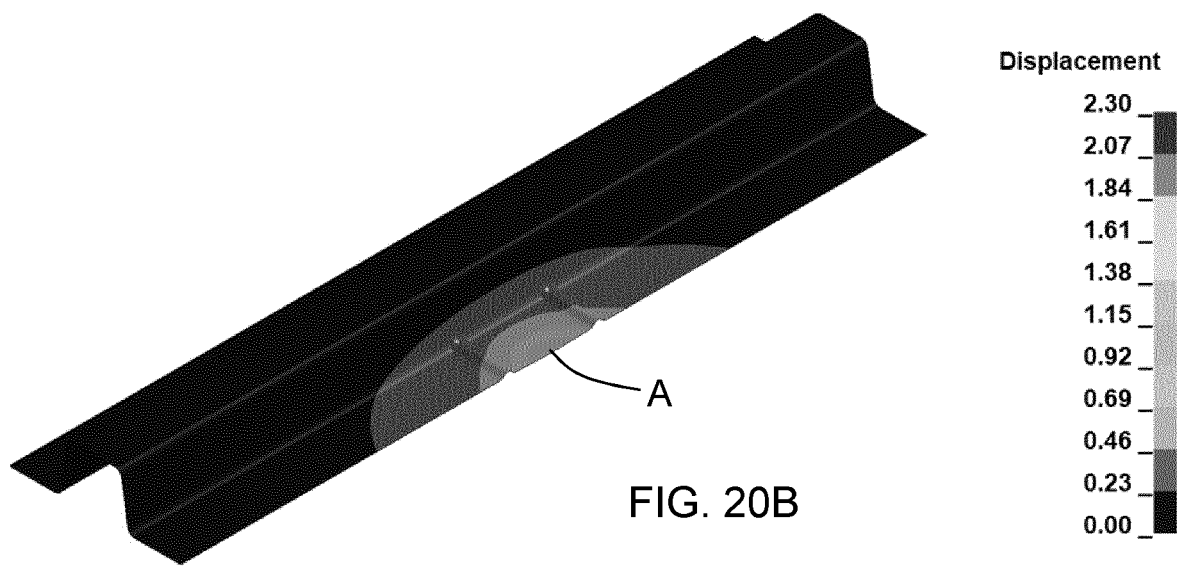

| Sheet metal part with distortion-absorbing area 4 | Figure 20B |
|---|---|
| Maximum distortion | 1.260 mm |
| Distortion in the center area A | 1.260 mm |
| % Reduced Maximum Distortion | 44.6% |
| % Reduced Distortion in center area | 44.6% |

Also, it must by pointed out, that the same part 1, can comprise a plurality of portions 2 being locally heat-softened in order to tailor the deformation behaviour of the part.

Finally, it cannot be discarded that the shape of the distortion-absorbing areas 4 is a combination of the embodiments explained before.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A forming sheet metal part for a vehicle frame comprising:
a first portion of said sheet metal part being locally heat-softened after said sheet metal part has been formed out,
wherein the sheet metal part further comprises:
a dedicated three-dimensional distortion-absorbing area, defining an internal boundary within which said first portion is to be locally heat-softened after said sheet metal part has been formed out, and
said distortion-absorbing area being dimensioned such that once said locally heat-softening step has been performed, said internal boundary is adjacent to said first portion and encloses said first portion to absorb the dimensional distortions induced by said locally heat-softened first portion, and wherein
said distortion-absorbing area (4) has a height between 2 and 20 mm.

2. The sheet metal part of claim 1, wherein said sheet metal part has a thickness between 0.5 and 8 mm.

3. The sheet metal part of claim 2, wherein said sheet metal part has a thickness between 0.5 and 6 mm.

4. The sheet metal part of claim 3, wherein said sheet metal part has a thickness between 0.5 and 3 mm.

5. The sheet metal part of claim 4, wherein said sheet metal part has a thickness between 0.8 and 2.5 mm.

6. The sheet metal part according to claim 1, wherein said distortion-absorbing area comprises rounded edges and said internal boundary is defined by the inner tangency line of said rounded edges.

7. The sheet metal part according to claim 6, wherein said rounded edges have a radius between 2 and 20 mm.

8. The sheet metal part according to claim 7, wherein said rounded edges have a radius between 2 and 10 mm.

9. The sheet metal part according to claim 1, wherein said locally heat-softened first portion is distanced between 0 and 50 mm to said internal boundary.

10. The sheet metal part according to claim 9, wherein said locally heat-softened first portion is distanced between 0 and 10 mm to said internal boundary.

11. The sheet metal part according to claim 1, wherein said first portion has an area between 100 mm² and 50,000 mm².

12. The sheet metal part according to claim 11, wherein said first portion has an area between 100 mm² and 15,000 mm².

13. The sheet metal part according to claim 1, wherein said distortion-absorbing area is one of the group formed by a projection, a recess or a surrounding bump and in that said distortion-absorbing area encloses a flat portion for performing said locally heat-softened first portion.

14. The sheet metal part according to claim 13, wherein when said distortion-absorbing area is a surrounding bump, it further comprises a plateau of greater than 0 to 20 mm wide.

15. The sheet metal part according to claim 1, wherein said internal boundary is a closed boundary such as to completely enclose said locally heat-softened first portion.

16. A forming sheet metal part for a vehicle frame comprising:
- a first portion of said sheet metal part being locally heat-softened after said sheet metal part has been formed out,
- wherein the sheet metal part further comprises:
- a dedicated three-dimensional distortion-absorbing area, defining an internal boundary within which said first portion is to be locally heat-softened after said sheet metal part has been formed out, and
- said distortion-absorbing area being dimensioned such that once said locally heat-softening step has been performed, said internal boundary is adjacent to said first portion and encloses said first portion to absorb the dimensional distortions induced by said locally heat-softened first portion, and wherein
- said distortion-absorbing area comprises rounded edges and said internal boundary is defined by the inner tangency line of said rounded edges.

17. The sheet metal part according to claim 16, wherein said rounded edges have a radius between 2 and 20 mm.

18. The sheet metal part according to claim 17, wherein said rounded edges have a radius between 2 and 10 mm.

19. A forming sheet metal part for a vehicle frame comprising:
- a first portion of said sheet metal part being locally heat-softened after said sheet metal part has been formed out,
- wherein the sheet metal part further comprises:
- a dedicated three-dimensional distortion-absorbing area, defining an internal boundary within which said first portion is to be locally heat-softened after said sheet metal part has been formed out, and
- said distortion-absorbing area being dimensioned such that once said locally heat-softening step has been performed, said internal boundary is adjacent to said first portion and encloses said first portion to absorb the dimensional distortions induced by said locally heat-softened first portion, and wherein
- said distortion-absorbing area is one of the group formed by a projection, a recess or a surrounding bump and in that said distortion-absorbing area encloses a flat portion for performing said locally heat-softened first portion.

20. The sheet metal part according to claim 19, wherein when said distortion-absorbing area is a surrounding bump, it further comprises a plateau of greater than 0 to 20 mm wide.

* * * * *